Oct. 19, 1971  R. J. ALLDS  3,613,203
METHOD AND APPARATUS FOR CONSTRUCTING CONVERTIBLE TOP LINKAGES
Filed Jan. 7, 1970  5 Sheets-Sheet 1

INVENTOR
RAYMOND J. ALLDS
BY Fay, Sharpe
& Mulholland
ATTORNEYS

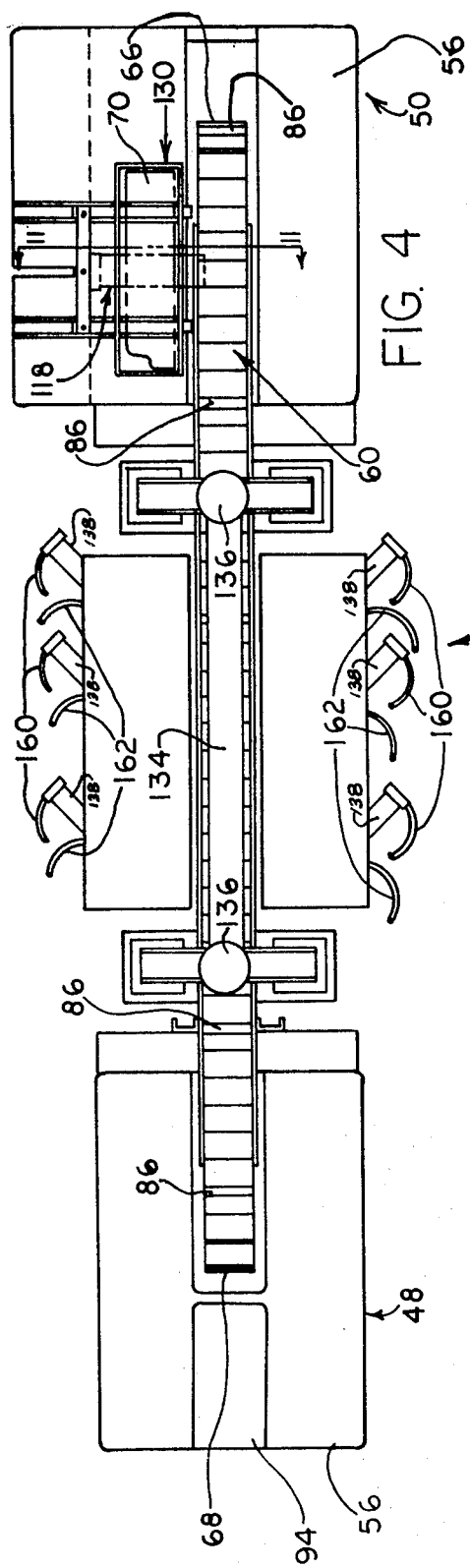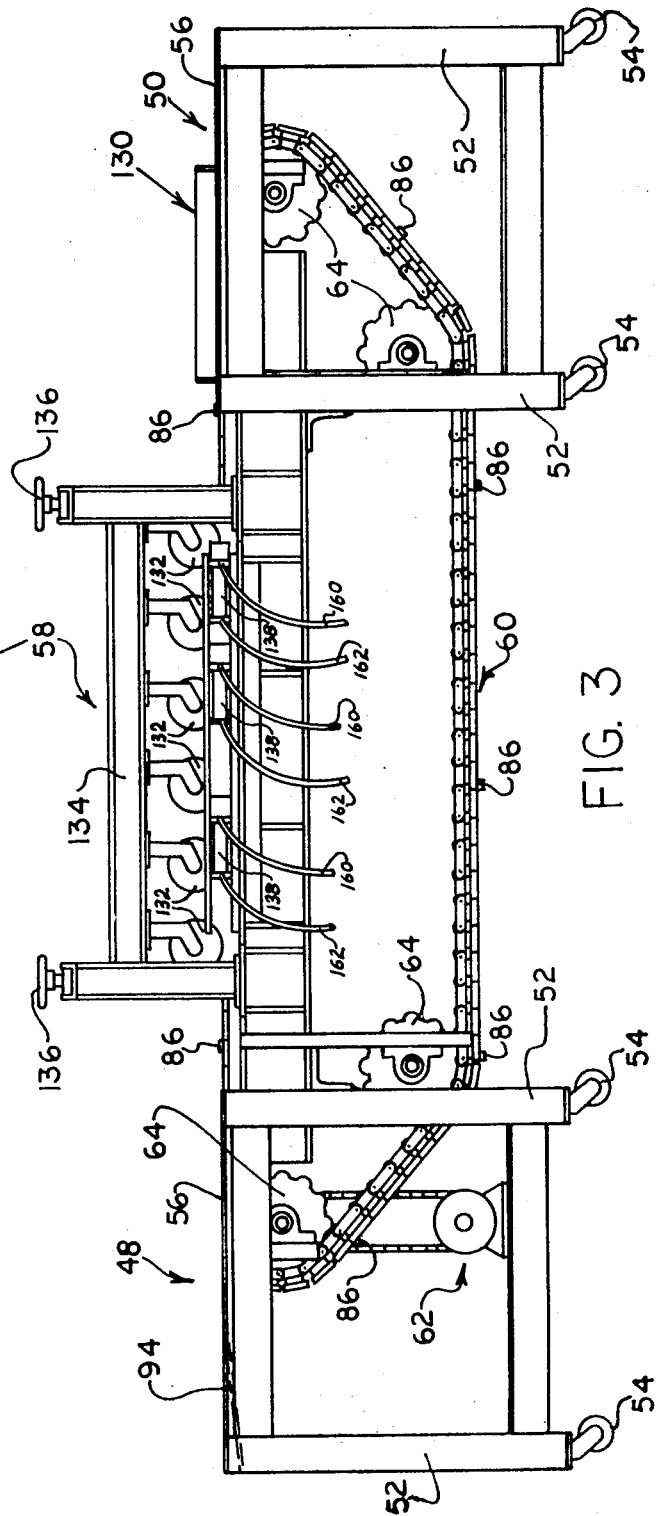

Oct. 19, 1971  R. J. ALLDS  3,613,203
METHOD AND APPARATUS FOR CONSTRUCTING CONVERTIBLE TOP LINKAGES
Filed Jan. 7, 1970  5 Sheets-Sheet 3
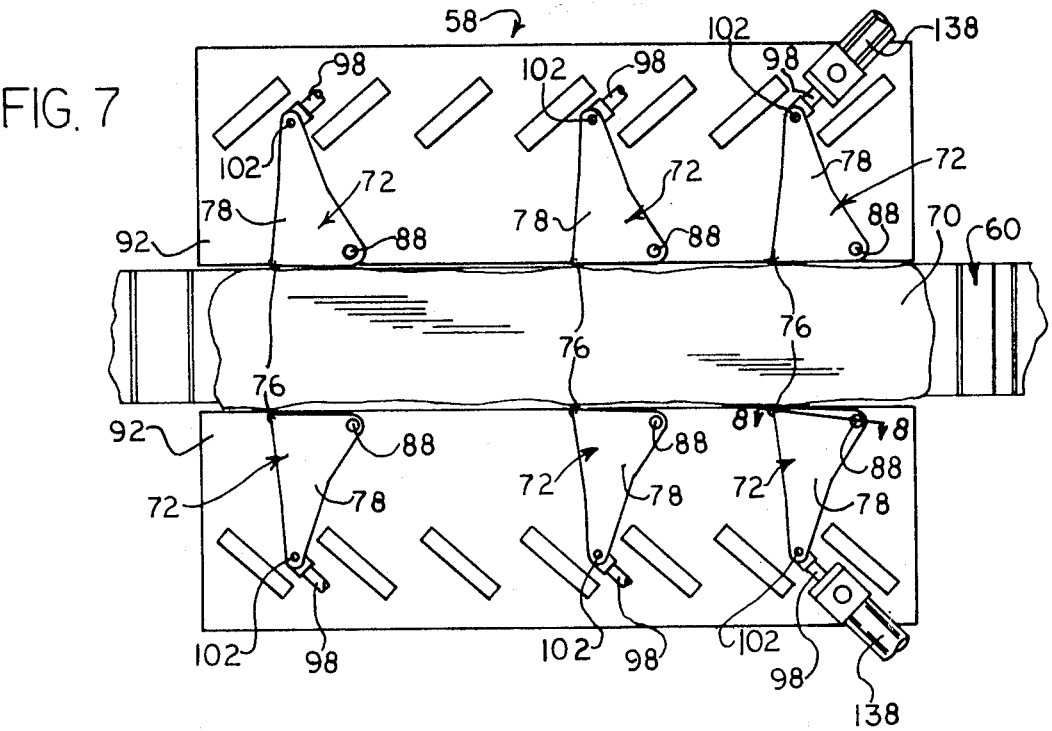
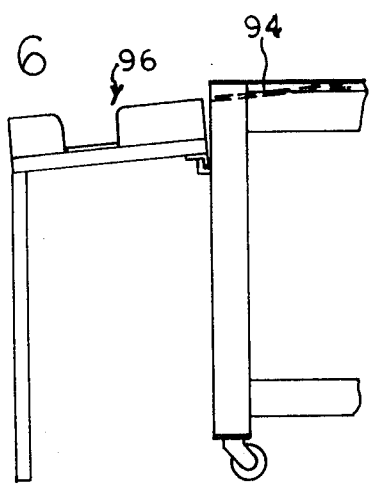
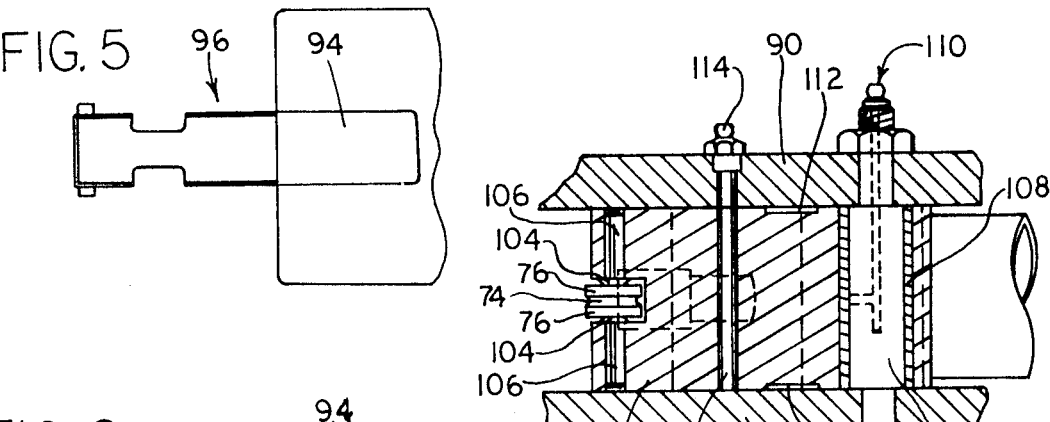
INVENTOR
RAYMOND J. ALLDS
BY Fay, Sharpe & Mulholland
ATTORNEYS

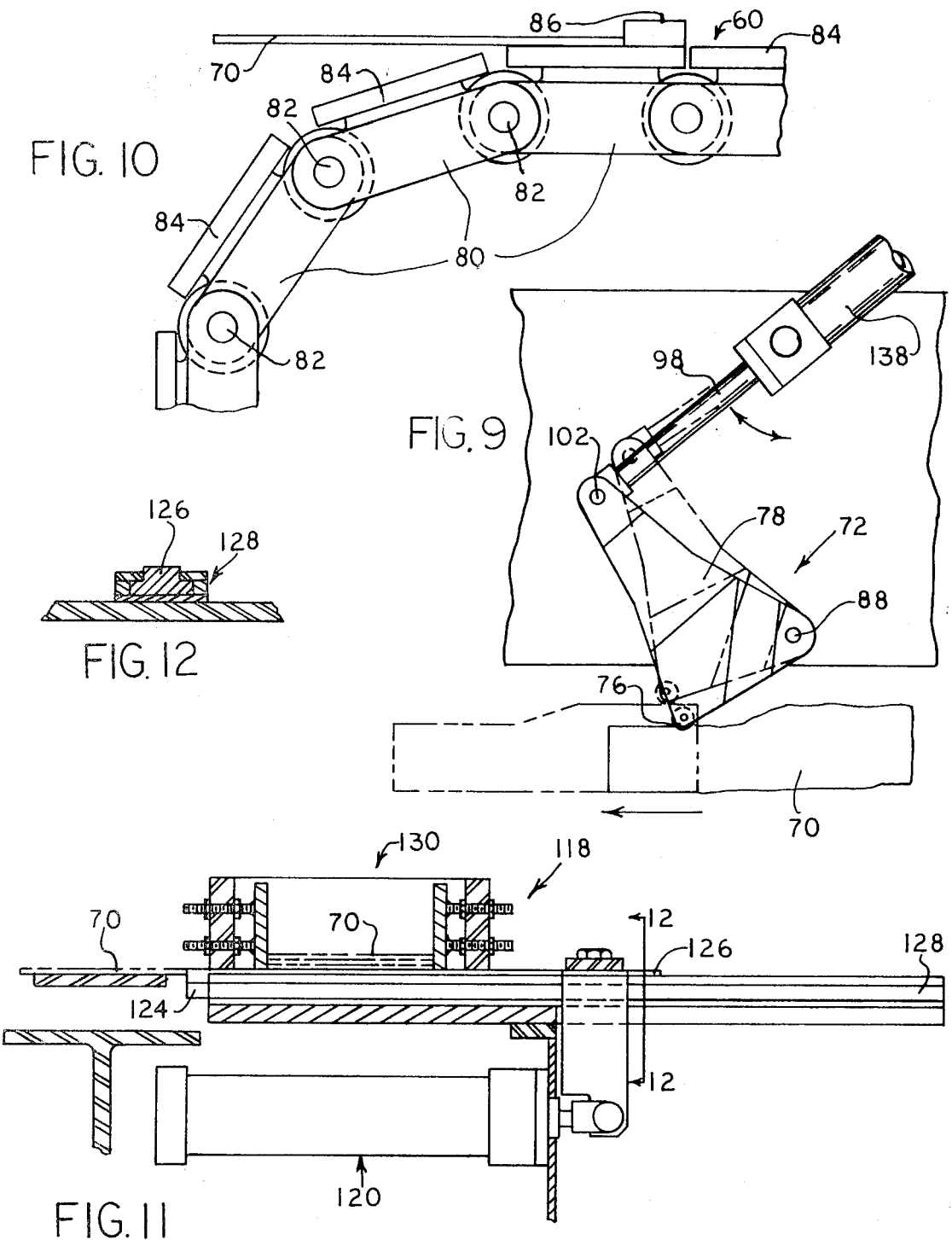

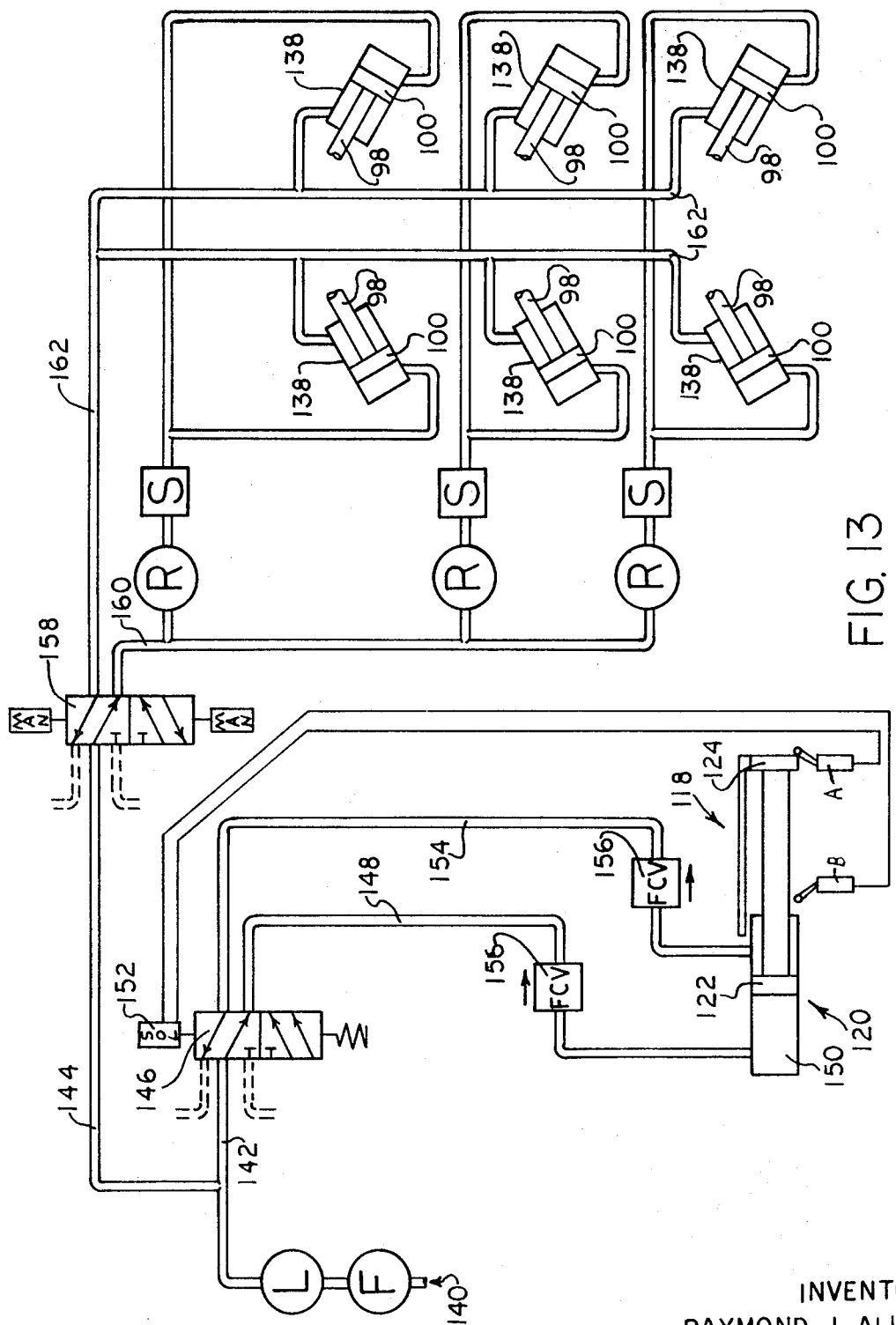

United States Patent Office 3,613,203
Patented Oct. 19, 1971

1

3,613,203
METHOD AND APPARATUS FOR CONSTRUCTING
CONVERTIBLE TOP LINKAGES
Raymond J. Allds, Ashtabula, Ohio, assignor to
Ashtabula Bow Socket Company, Ashtabula, Ohio
Continuation-in-part of application Ser. No. 638,492, May
15, 1967, now Patent No. 3,490,120, dated Jan. 20,
1970. This application Jan. 7, 1970, Ser. No. 874,980
The portion of the term of the patent subsequent to
Jan. 20, 1987, has been disclaimed
Int. Cl. B23p 17/04, 19/00
U.S. Cl. 29—155
13 Claims

ABSTRACT OF THE DISCLOSURE

This invention relates to a method and apparatus for deburring the rails, bows and links of a convertible top framework so as to prevent tearing of the convertible top material and injury to passengers. The method includes the use of novel, opposed-force deburring rollers which act on opposite edges of elongated sheared sheet metal blanks that are to form the framework elements. Pivoted arms support the rollers so that fluid driven pistons, such as hydraulic or air or air-hydraulic actuators, acting through the arms can supply the force for deburring even as the width dimension of the elongated blanks varies. The mechanism to accomplish the deburring provides for a changing lateral movement of the piston which drives the arm to accommodate the arc made by the pivoting arm during reciprocal movement of the piston.

BACKGROUND OF THE INVENTION

This application is a continuation-in-part of previously filed, copending application Ser. No. 638,492, now Pat. No. 3,490,120, Jan. 20, 1970.

In the production of convertible tops and in particular rails, bows and links for convertible top frameworks, it is customary to start from strip sheet steel and die shear various elements into planar blanks. These planar blanks are then die-formed to desired cross sections, assembled and fastened in interfitting relation to make the convertible top framework. After this operation has been completed, of course, the fabric top is added.

Automobile convertible tops have two basic stable conditions which are commonly called the top up position and the top down or "crash" position. Because of the metalworking and assembly procedures utilized in forming the framework elements from sheet steel stock and in particular because of the die shearing to shape which occurs, burrs or rough, sharp and jagged edges are formed on the sheared edges of the metal which, when the convertible top is in the top up or closed position, present a danger to the hands and other extremities of the passengers and when the convertible top is in the top down or "crash" position tend to create tears and localized fatigue areas in the fabric of the convertible top.

The resulting burrs are conventionally removed by rolling or grinding the rough edges of the sheared blank. Rolling the edges with prior machines is often unsatisfactory because the variable contours along the periphery of the blanks often do not get adequately deburred because of restricted motion of the rollers. Grinding is unsatisfactory because the abrasive dust left on the blank tends to abrade the dies in any subsequent die forming operation.

BRIEF DESCRIPTION OF THE INVENTION

Briefly, the present invention comprises an improved method and apparatus for making a convertible top frame in which sheet metal strips are die sheared into elongated blanks having variable widths along their lengths. The blanks are fed between and in edgewise contact with opposed rollers of the apparatus which, because of its construction, can maintain substantially opposed forces on the rollers to debur their edges. The blanks, after being deburred, are die formed into the desired cross-sectional configuration of the various frame elements and these elements are then assembled with the other necessary elements to form a convertible top frame. The apparatus for deburring has the opposed spaced rollers pivoted on arms having an opposite end portion which projects for a distance radially outwardly from the pivot point. A fluid driven reciprocating piston mounted in a cylinder housing acts on each of the arm ends to provide the deburring force.

Accordingly, it is an object of the method and apparatus of this invention to provide a simplified and accurate method of removing burrs and rough edges created by the die shearing of the planar metal blanks which are to be die formed into rails, bows and links of a convertible top framework.

It is a further object of this invention to provide an economical manner of providing edges which will present a safe and neat appearance and readily receive the metal finish and protective and decorative coatings and will not damage the fabric top.

These and other desirable objects will become more apparent upon a complete reading and understanding of the following description and drawings:

FIG. 3 is an elevational view of a deburring apparatus constructed according to the principles of this invention;

FIG. 4 is a plan view of the apparatus of FIG. 3;

FIG. 5 is a plan view of a receiver for deburred rails;

FIG. 6 is an elevational view of the receiver of FIG. 5;

FIG. 7 is a plan view of a typical die sheared blank passing through the deburring apparatus before being die formed into the desired cross-sectional shape;

FIG. 8 is a cross-sectional elevational view taken along line 8—8 of FIG. 7 showing the detailed structure of the deburring roller and support arm;

FIG. 9 is a plan view of one deburring element with an alternate operating position shown in phantom;

FIG. 10 is an elevational view of an endless conveyor belt supporting a sheared blank;

FIG. 11 is a cross-sectional elevational view of the magazine and feed mechanism for depositing a sheared blank on the conveyor belt taken along line 11—11 of FIG. 4;

FIG. 12 is a cross-sectional elevational view of the slide of the feed mechanism, taken along line 12—12 of FIG. 11; and FIG. 13 is a schematic view of the pneumatic and electrical systems which operate the pistons associated with the deburring rollers and the feed mechanism.

PREFERRED EMBODIMENT

Figure 1:
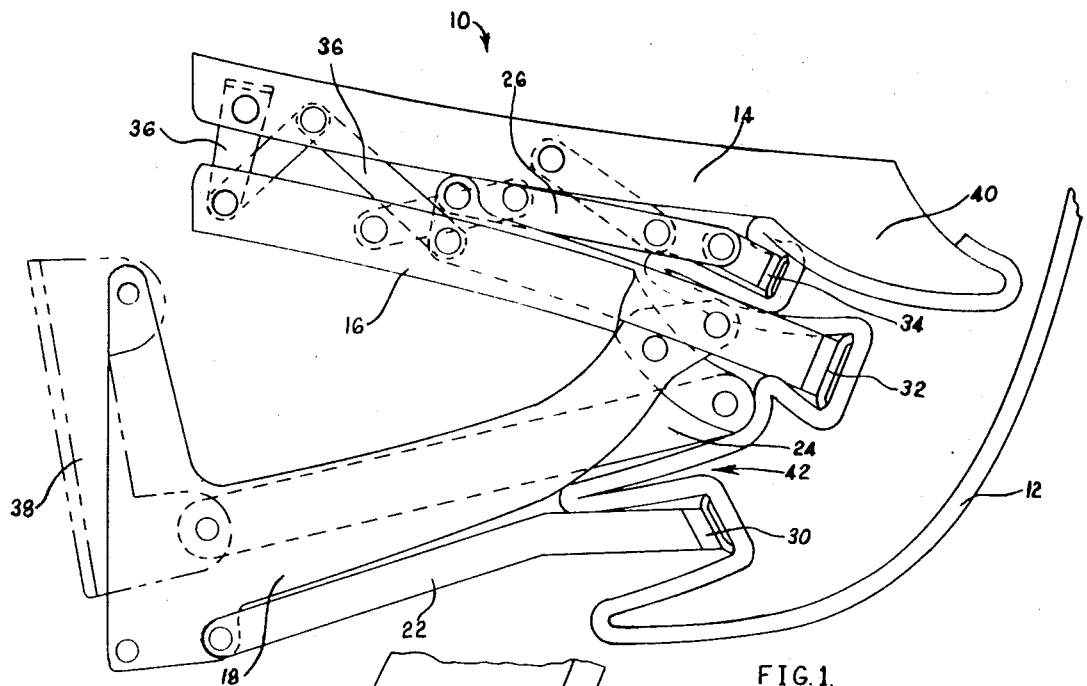
FIG. 1 represents a convertible top framework and fabric combination in the "crash" position with a portion of the rear fender well shown in phantom for orientation purposes.

An automobile convertible top, generally indicated by the numeral 10, is schematically illustrated in FIG. 1 and comprises basically: a fabric top 12 in a framework for supporting said fabric in both the closed or top up condition and top down or "crash" position.

In the illustrated "crash" position, the framework is made of the front rail 14, the center rail 16 and a rear rail 18 with like parts on the opposite side of an automobile. A fender well 20 is illustrated in phantom for orientation of the device. The top 10 further includes a rear link 22, a center link 24, and a front link 26, which are connected respectively to like parts on the opposite side of the automobile by the rear bow 30, the center bow 32, and the front bow 34. Numerous links 36 supplement the main links previously mentioned in providing the necessary movement of the frame into and out of the two stable positions. A bracket 38 and a top header 40 make up the remainder of the major components of the convertible top in sufficient detail.

The fabric 12 has a plurality of folds, such as the fold 42 between the center link 24 and the rear rail 18 and the rear link 22, such that it engages various edges of these elements. Since these elements are initially formed from strip steel by die shearing, if the burrs are not removed before assembly of the convertible top, when the top is in the "crash" position, folds of the fabric 12, such as shown at 42, become pinched and cut by the burred edges of the elements such as links 24 and 22 and the rail 18.

To eliminate this cutting is one of the major purposes of this invention. The other major purpose is to eliminate the possibility of a passenger of the automobile being injured by a laceration or damage to the skin on the burr edges.

Figure 2:
FIG. 2 represents a typical cross-sectional view of a convertible top framework rail.
Figure 2:
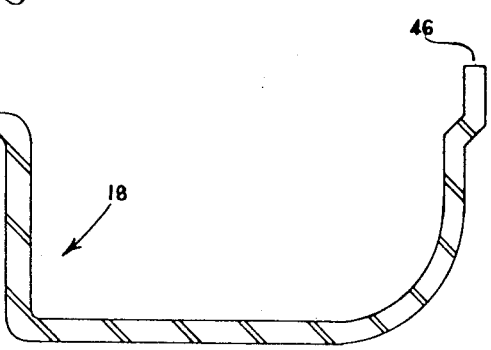

As shown in FIG. 2, a typical rail cross section illustrates the manner in which these edges are exposed, both to the fabric and to the passengers of the automobile. It will be seen that the edges 44 and 46 of the rail 18 in the position shown in FIG. 1 for example, open downwardly to permit movement of the center link 24 into the enclosure. In so doing, the fabric could come into contact with the edges 44 and 46 and be damaged or have abnormal wear.

The novel apparatus of the invention is designed to prevent these major problems by providing an economical manner of deburring the edges of the elements before they are die formed into the shape of FIG. 2 from a flat planar die sheared blank, as illustrated in FIG. 7.

Installed deburring apparatus, as seen in FIGS. 3 and 4, includes two generally rectangular tables 48 and 50, each supported by four legs 52, one on each corner. The apparatus is a unitary structure and may be easily moved about a plant as desired by virtue of supporting wheels 54 at the lower end of each leg 52. Supported between the two table tops 56 is the deburring structure, indicated generally at 58. Thus, the tables are held spaced apart in aligned position at opposite ends of the deburring structure.

An endless conveyor belt or support means 60 extends from one table to the other through the deburring structure with the upper surface of the belt being in proximity to the upper surfaces of the table tops 56. Conventional drive means 62 is supported below one table 48 and drive and guide sprockets 64 are provided as needed to drive and align the belt. As shown, the belt 60 passes up through an opening 66 in the first table 50, horizontally through the deburring structure 58 and then down through an opening 68 in the second table 48.

Basically, the blanks 70 to be deburred are fed individually onto the continuously moving conveyor belt 60 which carries the blanks in single file along a deburring line between paired deburring elements 72, see FIG. 7. Oppositely directed compressive forces are exerted on the edges of the blank 70 by the deburring elements. Rounded edges are thus formed on the blank by virtue of the concave engaging surfaces 74 of rollers 76 rotatably attached near one corner of a generally triangular shaped lever arm 78; this structure is best illustrated in FIG. 8.

Referring to FIGS. 7 and 10, the conveyor belt 60 includes a plurality of links 80 fixed together by pins 82. Each link 80 includes a flat facing member 84 which carries the blanks 70 on its upper surface. Uniformly spaced along the belt and fixed to some of the facing members 84 are upstanding blocks 86. The blocks 86 move with the belt and engage the rear of the rough blanks 70 as they move along the deburring line and force them between the rollers 76 on the deburring elements 72. Stationary pins 88 extending between parallel walls 90 and 92, as shown in FIG. 8, project through openings in a second corner of the triangular slabs or pivot arms 78 to serve as pivot points. Each combination or pivot arm 78, pin 88 and roller 76, for convenience, is referred to as a deburring element 72.

Each sheared blank 70 is deburred in the deburring line and, thereafter, the smoothed blank is deposited in a sloping trough 94 at the end of the line. The force of gravity and the other deburred blanks following thereafter urge them toward a receiver 96 which catches and supports them in a vertical stack and acts as a temporary storage bin.

As seen in FIGS. 7 and 13, each deburring element 72 is pivotally associated by pin means 102 with piston extension 98 which is fixed to a piston 100. The wheel or deburring roller 76 is held within the arm 78 by bearings 104 set in holes 106 in the arm. A cylindrical bearing 108 circumscribes each pin 88 and a suitable lubricating structure 110 is provided therefor. Recesses 112 are formed on each side of the lever arm 78 to facilitate lubrication provided by grease from fitting 114 and aperture 116.

Each deburring roller 76 includes an annularly extending groove 74 for receiving and smoothing the burred edges of the sheared rails.

Illustrated in FIG. 11, the feed mechanism, indicated generally at 118, comprises a conventional fluid driven reciprocating piston means 120 having a piston 122 therein, see FIG. 13, with a work engaging member 124 for moving workpieces 70 onto the conveyor belt 60 which will subsequently pass the blank through the roller deburring line. FIG. 12 shows the reciprocating slide 126 of the feed mechanism in cross section supported in a guide means 128.

To avoid a bunching up or bowing of the material workpieces 70 as they are picked from the stack in the magazine 130 and moved into line behind the preceding workpiece, work hold-down means 132 are provided above the conveyor belt 60 between the tables, as shown in FIG. 3. Each of the hold-down means 132 is carried by I-beam means 134 which is moved to any desired vertical position by conventional screw clamps 136 at each end thereof.

As illustrated in FIG. 9, each blank 70 enters one end of the roller edged deburring line from the feeding magazine 130 with burred edges and emerges at the other end, because of the force application mechanism acting upon the pivoting elements 78, with smooth rounded deburred edges. Thus, the blank 70 is progressively deburred along the deburring line because of the swaging, deburring pressure applied to the edges by the roller 76. And the apparatus does apply deburring pressure even though the blank itself varies in width, for example see the blank 70 of FIG. 9 which shows the deburring element 72 in alternate operating positions.

The mechanism which applies the force to all the pivotable lever arms 78 and consequently, to the rollers 76, is illustrated best in FIG. 13. An actuating cylinder is made up of a housing 138 and the piston 100. The extension 98 is pivotally connected at 102 to the lever arm 78 opposite the pivot point 88 and the roller 76. As the pressure of air or hydraulic fluid is applied within the cylinder housing 138, the piston 100 and extension 98 force the lever arm 78 to rotate about the pin 88. This urges the wheel 76 against the edge of the sheared rail 70 to smooth the burrs. Because the lever arm 78 moves, the cylinder 138 must move in a corresponding direction. Thus, each cylinder housing 138 associated with each pivoting segment 78 must move in an arcuate path as the piston 100 reciprocates within the housing 138. This pivoting action of the cylinder housing 138 permits the deburring force to be applied by air or hydraulic pressure to the lever arm 78 and thus, to the roller 76. All of the deburring elements and pistons illustrated in FIG. 7 are connected to operate in this manner.

As viewed in FIG. 13, air is fed into the system through feed line 140 and through a filter F and a lubricator L. Two lines 142 and 144 branch from the feed line 140 downstream of the filter and lubricator.

The first branch line 142 communicates with a solenoid controlled valve 146 which controls the reciprocating piston means 120 of the feed mechanism 118. Air flows through the valve 146 and line 148 to the cylinder housing 150 of the feed mechanism 118. Increasing pressure within the housing 150 urges the piston 122 to the right and delivers a workpiece 70 onto the conveyor belt 60, as best seen in FIGS. 3, 4 and 11. At the end of the workpiece delivery stroke, the piston means 120 trips a switch A which actuates the solenoid 152 to shift the air flow through the valve 146 from line 148 to line 154 which connects to the opposite end of the cylinder 150. The result is a retraction of the piston means 120 into the housing 150 until a second switch B is tripped by the piston and the procedure is reversed. To prevent a sudden surge of air pressure or irregular movements of the piston means 120, flow control valves 156 are provided in the air lines 148 and 154 leading to the cylinder housing 150. In this manner the speed of the conveyor belt 60 can be synchronized with the workpiece feeder 118 for efficient operation.

The second branch line 144 extending from the feed line 140 communicates with a manually operated valve 158. When the manual valve 158 is oriented to cause deburring of workpiece 70 on the conveyor belt 60, air flows through line 160, pressure regulators R and surge tanks S to the cylinder housings 138 of the opposed pairs of piston actuated pivot arms 78. The regulators R and surge tanks S insure substantially equal pressure in each pair of cylinders; this tends to reduce erratic movements of the blank 70 on the belt with a change in width dimension. For the same reason, the opposed pairs of rollers are designed to fall substantially in a plane perpendicular to the path of the blanks 18. It is permissible to have varying pressures longitudinally along the deburring line, but the sum of the forces on one side of the blank will obviously equal those on the other side. However, a pressure variation may occur from time to time in the same roller set which may be as much as ten percent, for example 4 p.s.i. when the normal pressure applied is 40 p.s.i.

Each regulator R is thus manually controlled to set the pressure on the high pressure side of the cylinder 138. Communicating with the low pressure side of each cylinder 138 is a "dump" line 162 which is connected through the valve 158 to the atmosphere. To retract the extensions 98 and pivot arms 78, one merely reverses the positions of lines 160 and 162 by a manual switch of the valve 158. However, it is only when the apparatus is clear of workpieces that line 160 is not the pressure line.

While the preferred embodiment illustrated includes fluid actuated pistons, it is clear that solenoid controlled actuating arms could be substituted for the fluid controls. This concept is not illustrated but it is within the concept of this invention as well as other equivalent devices.

Thus, it will be seen that a novel method of deburring the rails, bows and links of convertible top frameworks has been provided by means of the novel apparatus illustrated in the accompanying drawings.

It will be understood, of course, that modifications can be made in the preferred embodiments of the invention described and illustrated herein without departing from the scope and purview of the appended claims.

The invention claimed is:

1. A method of making a convertible top frame which comprises the steps of die shearing sheet metal strips to form elongated blanks having variable contours along their peripheries feeding the blanks between and in edgewise contact with opposed rollers mounted on individual lever arms while maintaining a swaging force on said rollers, pivoting the lever arms upon which the rollers are mounted, die forming said blanks into the desired cross-sectional configuration for the frame element to be formed and assembling said element with other elements to form the convertible top frame.

2. The method of claim 1 in which the step of pivoting the arms upon which the rollers are mounted includes the step of actuating fluid driven pistons mounted in cylinder housings and attached to said arms.

3. The method of claim 2 in which the step of actuating the fluid driven pistons includes the step of moving the cylinder housings laterally to accommodate the arc made by the pivoting arms during reciprocal movement of the pistons.

4. The method of claim 1 including the step of providing two rollers in opposed operating positions to contact the blank at locations whereby a line drawn between them is substantially perpendicular to the direction of feed.

5. A deburring apparatus comprising moving support means, opposed spaced rollers adjacent said support means, pivoted arms supporting each of said rollers adjacent an end thereof with an opposite end portion projecting for a distance radially outwardly from a pivot point, means acting on each of said arm end portions opposite said rollers to provide a force against opposite edges of a member to be deburred in motion on said support means between said rollers even though the distance between said edges varies as said member is fed past said rollers.

6. The apparatus of claim 5 in which the means acting on each of said arm end portions is a fluid driven reciprocating piston mounted in a cylinder housing.

7. The apparatus of claim 5 wherein the rollers comprise at least one pair of rollers at locations whereby a line drawn between them is substantially perpendicular to the direction of motion of the member.

8. The apparatus of claim 5 including means for feeding plural members to be deburred to the support means in sequence, whereby each pair of rollers contacts only one member at any one instant.

9. The apparatus of claim 8 wherein the means for feeding is synchronized with the speed of the support means.

10. A method of making metal stampings comprising,
die shearing metal strips to form elongated blanks having variable contrours along their peripheries,
feeding the blanks between and in edgewise contact with opposed rollers mounted on individual lever arms while maintaining a swaging force on said rollers,
pivoting the lever arms upon which the rollers are mounted to maintain the rollers in contact with the peripheries of said blanks.

11. The method of claim 10 in which the step of pivoting the arms upon which the rollers are mounted includes the step of actuating fluid driven pistons mounted in cylinder housings and attached to said arms.

12. The method of claim 11 in which the step of actuating the fluid driven pistons includes the step of moving the cylinder housings laterally to accommodate the arc made by the pivoting arms during reciprocal movement of the pistons.

13. The method of claim 10 including the step of providing two rollers in opposed operating positions to contact the blank at locations whereby a line drawn between them is substantially perpendicular to the direction of feed.

References Cited

UNITED STATES PATENTS

| | | | |
|---|---|---|---|
| 3,362,056 | 1/1968 | Preller et al. | 29—155 |
| 3,406,439 | 10/1968 | Hutchens | 29—155 |

THOMAS H. EAGER, Primary Examiner

U.S. Cl. X.R.

29—200 A, 200 B, 434